(12) United States Patent
Butler et al.

(10) Patent No.: US 7,650,739 B2
(45) Date of Patent: Jan. 26, 2010

(54) MULCH PLATE APPARATUS WITH ADJUSTABLE HANDLE MECHANISM

(76) Inventors: Walter R. Butler, 18901 SW. 63rd St., Southwest Ranches, FL (US) 33332; Dena R. Butler, 18901 SW. 63rd St., Southwest Ranches, FL (US) 33332

( * ) Notice: Subject to any disclaimer, the term of this patent is extended or adjusted under 35 U.S.C. 154(b) by 16 days.

(21) Appl. No.: 11/970,845

(22) Filed: Jan. 8, 2008

(65) Prior Publication Data

US 2008/0250768 A1   Oct. 16, 2008

Related U.S. Application Data

(63) Continuation-in-part of application No. 11/226,977, filed on Sep. 15, 2005, now Pat. No. 7,337,602.

(51) Int. Cl.
*A01D 67/00* (2006.01)
(52) U.S. Cl. .................. 56/320.2; 56/17.4; 56/DIG. 24
(58) Field of Classification Search .................. 56/17.5, 56/320.1, 320.2, DIG. 24
See application file for complete search history.

(56) References Cited

U.S. PATENT DOCUMENTS

| | | | |
|---|---|---|---|
| 4,462,235 A | 7/1984 | King | |
| 4,478,028 A | 10/1984 | Dawson, Jr. | |
| 4,854,115 A | 8/1989 | Jones et al. | |
| 5,048,279 A | 9/1991 | Badawey et al. | |
| 5,117,616 A | 6/1992 | McLane | |
| 5,123,235 A | 6/1992 | Fassauer | |
| 5,179,823 A | 1/1993 | Pace | |
| 5,337,545 A | 8/1994 | Butler | |
| 5,491,964 A | 2/1996 | Butler | |
| 5,826,417 A | 10/1998 | Evans | |
| 5,870,888 A | 2/1999 | Pugh | |
| 6,609,358 B1 | 8/2003 | Schmidt et al. | |
| 6,874,309 B1 | 4/2005 | Bellis, Jr. | |
| 6,874,310 B2 | 4/2005 | Osborne | |

*Primary Examiner*—Thomas B Will
*Assistant Examiner*—Mai T Nguyen
(74) *Attorney, Agent, or Firm*—Christopher & Weisberg, PA

(57) ABSTRACT

A mulch plate adjustment apparatus for use with lawn mowers. The adjustment apparatus is used to adjust the height of a mulch plate attached to the lawn mower and to secure the mulch plate at the desired height by the use of a handle and handle-locking ratchet mechanism. The adjustment apparatus is affixed to the discharge chute of a lawn mower. The apparatus includes a handle-operated mulch plate raising-and-lowering mechanism that allows the mulch plate to be adjusted to different heights to accommodate different sized lawn mowers and different mowing conditions. The operator of the mulch plate adjustment apparatus can select a desired height for the mulch plate and safely secure the mulch plate at the selected height by simple operation of a handle. Further, the mulch plate apparatus provides a mechanism for allowing the mulch plate to be raised in a storage position without the need to provide extension wires or cables.

6 Claims, 11 Drawing Sheets

MULCH PLATE APPARATUS WITH ADJUSTABLE HANDLE MECHANISM

CROSS-REFERENCE TO RELATED APPLICATION

This application is a continuation-in-part-of patent application Ser. No. 11/226,977, filed Sep. 15, 2005, now U.S. Pat. No. 7,337,602 entitled MULCH PLATE APPARATUS WITH ADJUSTABLE HANDLE MECHANISM, the entirety of which is incorporated herein by reference.

STATEMENT REGARDING FEDERALLY SPONSORED RESEARCH OR DEVELOPMENT n/a

FIELD OF THE INVENTION

The present invention relates to a mulching apparatus, and, in particular, to an adjustable mulch plate attachment apparatus for lawn mowers, the attachment apparatus is used to adjust the height of a mulch plate and to secure the mulch plate at the desired height by the use of a handle and handle-locking ratchet mechanism.

BACKGROUND OF THE INVENTION

Mulching allows for maintaining an even soil temperature, controlling weeds and enriching soil, whereby a mixture of organic material (such as straw, peat moss or leaves) is spread over a landscape. When grass clippings from a lawn mower are sufficiently reduced in size to small particles, they may serve as a mulching agent. Conventional mowers, however, are incapable of refining grass clippings to a sufficiently small size. The typical lawn mower propels a rotary blade to cut grass into clippings and either deposits those clippings onto the lawn or directs them into a catcher. Clippings discarded on a lawn take weeks to decompose and can turn to a thatch and smother the soil rather than fertilizing it, unless the clippings are raked and removed. Catchers are undesirable since mowing must be interrupted frequently to empty the contents of the catcher. In either event, the wasted time could be better spent cutting additional grass.

Alternatively, mulching lawn mowers reduce expenses, increase crew efficiency and decrease waste. Mulching lawn mowers are designed to cut grass clippings into tiny particles that decompose quickly once returned to the lawn, providing nourishment and moisture to the underlying soil. In theory, mowing time can be cut, fertilizer, trash bag and water expenses reduced, and productivity enhanced. Unfortunately, mulching lawn mowers used today are only useful under special conditions, do not work adequately in thick or heavy grass and require frequent maintenance. For example, mulching mowers normally require short, dry grass, flat landscapes and frequently honed blades. These mowers also leave uncut strips that necessitate recutting, especially on lawns having a high moisture content, tall grass or hills. In addition, moist grass that is cut has a tendency to stick to the underside of the conventional mulching mower, reducing the mulching capability and eventually dropping clumps of grass on the lawn and/or paved areas.

Conventional mulching mowers suffer from the foregoing shortcomings or they are too complex to operate reliably. For example, U.S. Pat. No. 5,117,616 to McLane discloses a mulching lawn mower that deposits clippings in front of the mower for recirculation. McLane's mower comprises a deck which covers a rotating blade and a curved deflector which lies adjacent an opening provided in the deck between the front wheels. The deflector redirects air and grass exiting the opening downward in front of the mower. The positioning of the opening and deflector at the front of the deck allows the mower to run over grass clippings a second time, but if the grass is too wet, the opening clogs and suction under the deck becomes insufficient to lift the wet clippings off the lawn and into the cutting area.

An air-floated mulch recycle system, issued to Fassauer in U.S. Pat. No. 5,123,235, employs an air-floated housing having a rotatable cutting blade, an open bottom, an air intake opening conduit and a rear discharge port. A mulch recycling system comprised of a conduit attaches to the discharge port to receive grass clippings produced by the mower for delivery to the front of the mower for recutting. An air impeller means pressurizes air to float the mower, but inhibits the mower's ability to draw grass clippings into the mulch recycling system. Moreover, dry grass is preferred for cutting since wet clippings are difficult to lift into the blade, stick to the underside of the housing and clog the tubular chute used in the mulching system.

Another mulching device is disclosed in U.S. Pat. No. 5,048,279 issued to Badawey, and is utilized as a leaf mulcher for use with a rotary blade lawn mower. The leaf mulcher comprises a rotary blade lawn mower, a grass outlet and a screen mounted on the mower over the outlet. The screen provides a cutting edge for leaves dispersed from the outlet of the mower but does not facilitate the mulching of grass clippings, is easily clogged and is ineffective on damp lawns.

Another inherent problem with prior art mulchers is their inability to be used effectively in locations with severe space constraints. Hand-adjustable mulch plates must initially be positioned at a proper height and, if a tight corner is approached or a change in grass density occurs, must then be re-positioned at a different height, a task usually involving loosing the attached plate, re-positioning it, and retightening the attachment mechanism. Re-positioning the mulch plate to achieve a different height is time consuming. Re-adjusting the mulch plate to accommodate different grass heights and space-restricted areas may result in a significant increase in total job time.

While the aforementioned background art discloses various designs for mulching debris from a rotary lawn mower, there is presently no disclosure of a low profile mulcher that is adaptable to most mowers and capable of reducing clippings of various types (e.g., high grass or wet grass), and under diverse conditions, to a mulch for discarding as a nutrient into lawns. Further, there is presently no mulch design incorporating a mulch plate controller that allows the user to easily raise and/or lower the mulch plate to one of a variety of different heights without the need to manually lift the plate and move it to a different position.

There is, therefore, a need for a mulching lawn mower that is able to reduce clippings from tall and wet lawns into fine particles for depositing the particles back into the lawns as a fertilizing nutrient and incorporating a handle-operated controller to adjust the height of the mulch plate to a variety of settings in order to accommodate different mulching conditions. This invention is intended to solve the problems not adequately resolved by the background art.

SUMMARY OF THE INVENTION

The present invention advantageously provides an apparatus that allows for easy adjustment to the height of a mulch plate attached to a lawn mower and for the ability to route cable around the mower's engine and other obstacles. According to one aspect of the invention, a mulch plate apparatus for use with a lawn mower is provided. The lawn mower has a discharge chute for expulsion of mower clippings. The mulch plate apparatus includes a deck oriented over the discharge chute of the lawn mower, a mulch plate rotatably connected to the deck or to the mower itself so as to be struck by mower clippings expelled through the discharge chute, and a mulch plate adjustment assembly connected to the mulch plate and affixed to the deck or mower body to facilitate raising and lowering of the mulch plate. The mulch plate includes one or more air vents in order to facilitate and regulate air flow throughout the apparatus.

According to another aspect, a mulch plate adjustment assembly for use with a mulch plate rotatably attached to a lawn mower is provided. The mulch plate adjustment assembly includes a handle retention assembly affixed to the lawn mower, the handle retention assembly including a handle-retention groove, a handle movable within the groove of the handle retention assembly, and a mulch plate connection assembly connecting the handle retention assembly to the mulch plate in order to facilitate raising and lowering the mulch plate by operation of the handle, the mulch plate movable from a lowest position to a highest position and increments therebetween. The mulch plate includes one or more air vents in order to facilitate and regulate air flow throughout the apparatus.

In still another embodiment of the invention, a mulch plate apparatus for use with a lawn mower is provided wherein the lawn mower has a discharge chute for expulsion of mower clippings. The mulch plate apparatus includes a mulch plate rotatably connected to the lawn motor so as to be struck by mower clippings expelled through the discharge chute, and a mulch plate adjustment assembly affixed to the lawn mower to facilitate raising and lowering of the mulch plate. The mulch plate includes one or more air vents in order to facilitate and regulate air flow throughout the apparatus.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention advantageously provides a mulch plate adjustment apparatus affixed to the discharge chute of a lawn mower that includes a handle-operated mulch plate raising-and-lowering mechanism to allow the mulch plate to be adjusted to different heights to accommodate different sized lawn mowers and different mowing conditions. The present invention allows the user of the mulch plate adjustment apparatus to select a desired height for the mulch plate and safely secure the mulch plate at the selected height by simple pulling or pushing a handle. Further, the adjustment apparatus provides a mechanism for allowing the mulch plate to be raised in a storage position without the need to provide extension wires, cables or any additional hardware.

Figure 1:
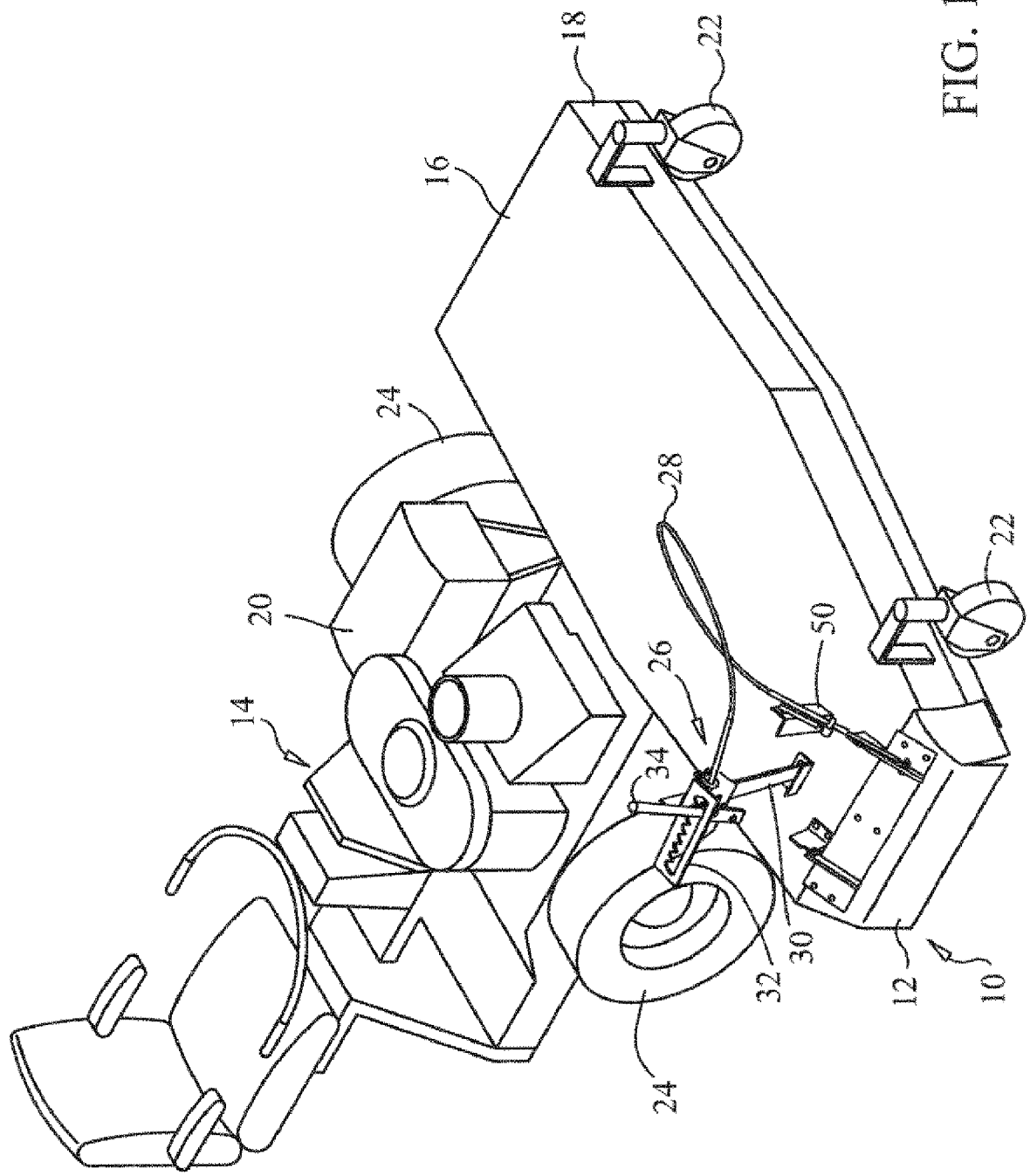
FIG. 1 illustrates a perspective view of the mulch plate apparatus of the present invention in a closed position affixed to a lawn mower.

Referring now to the drawing figures in which like reference designators refer to like elements there is shown in FIG. 1 an apparatus constructed in accordance with the principles of the present invention and designated generally as "10". Lawn mower 14 is comprised of a deck 16 integrally combined with a depending skirt 18 around its peripheral edge, a motor 20 having a plurality of rotatable blades (not shown) and a discharge chute or outlet (not shown) defined by a portion of the skirt 18 in the side of deck 16, and covered my mulch plate 12

Lawn mower 14 is supported by front wheels 22 and rear wheels 24 which allows the lawn mower to be transported easily over the ground. It should be noted that lawn mower 14 shown in FIG. 1 is illustrative of a typical lawn mower used in connection with the present invention. Other types and designs of lawn mowers, whether riding lawn mowers or "walk-behind" lawn mowers may also be used with the mulch plate apparatus disclosed herein with equally effective results. When motor 20 is activated, grass is lifted for cutting and simultaneously propelled outward towards the chute. Grass clippings, along with other shredded debris, and large air volume are prevented from immediately leaving the chute by mulch plate 12, which is attached to the deck 16 adjacent the chute.

Apparatus 10 is attached to lawn mower 14. Apparatus 10 includes mulch plate 12 and is depicted in FIG. 1 in its closed configuration. Connected to mulch plate 12 is a mulch plate adjustment assembly 26. Assembly 26 is coupled to mulch plate 12 via a connecting cable 28. Assembly 26 includes a substantially vertical elongated support stand 30, a ratchet assembly 32 and a hand-activated handle 34. As will be discussed in greater detail below, assembly 26 allows mulch plate 12 to be raised and/or lowered to a variety of different positions by operation of handle 34. This allows the user to accommodate differently-shaped and sized lawn mowers, enlarges the holding volume capacity thus allowing air to leave, provides mower suction to pull grass back under the deck of the mower, allows for easy inspection of the lawn mower's blades, can accommodate cutting in confined spaces, and allows for easy storage. In an alternate embodiment, assembly 26 is not located on deck 16, but on lawn mower 14, for example on the handle of a walk-behind mower.

Figure 2:
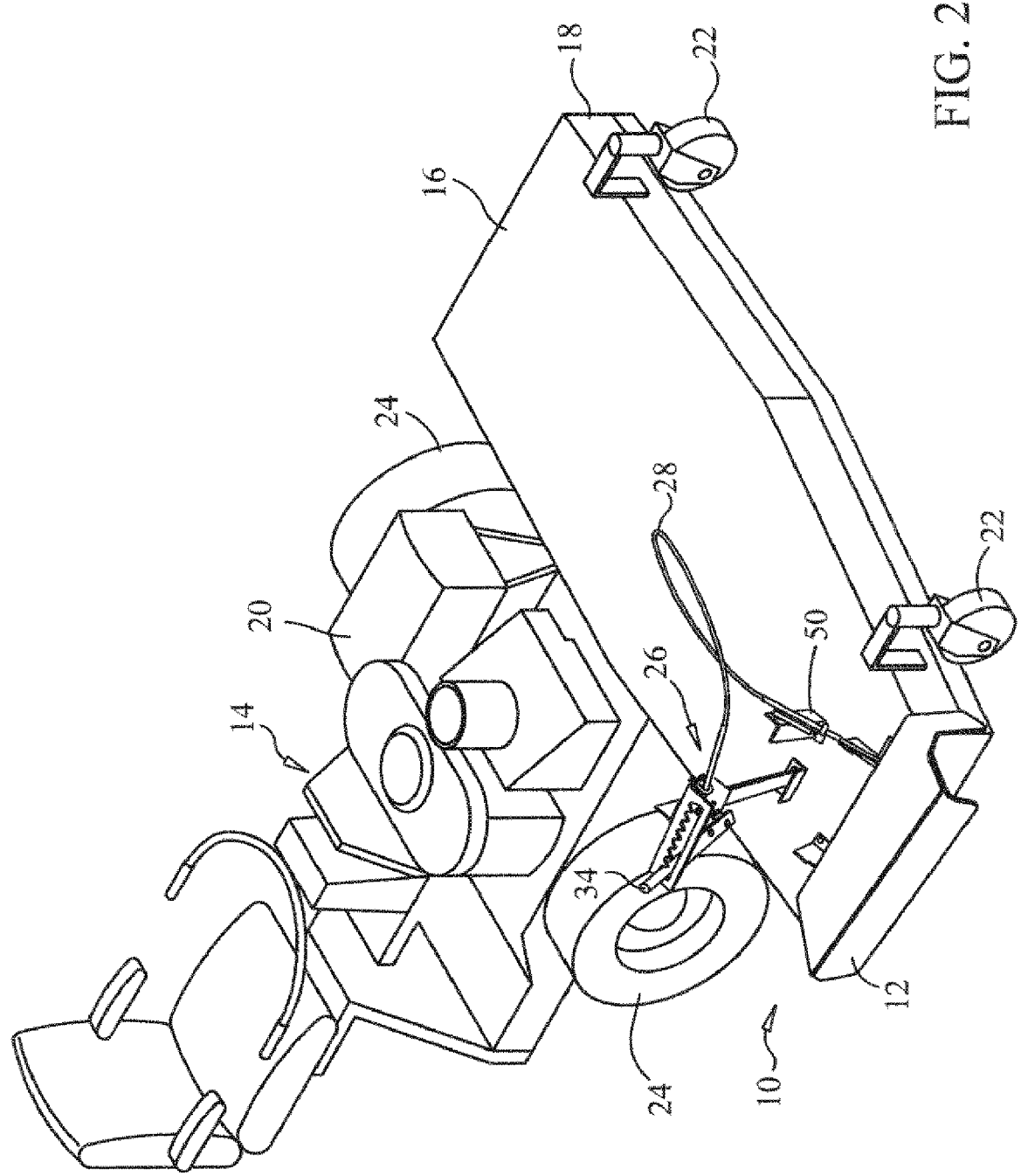
FIG. 2 illustrates a perspective view the mulch plate apparatus of the present invention in an open position affixed to a lawn mower.

FIG. 2 shows apparatus 10 with mulch plate 12 in an open configuration. As described above, it may be desirable to adjust the height of mulch plate 12 and secure it in a variety of positions with respect to the lawn mower chute. Each position of mulch plate 12 corresponds to a different amount of volume under and adjacent to deck 16 and can accommodate a different grass condition e.g., long grass, short grass, wet grass, etc. If mulch plate 12 clogs, the user can simply raise mulch plate 12 via assembly 26 to a higher setting, until the grass is cleaned from the chute and the area mulched satisfactorily.

Figure 3:
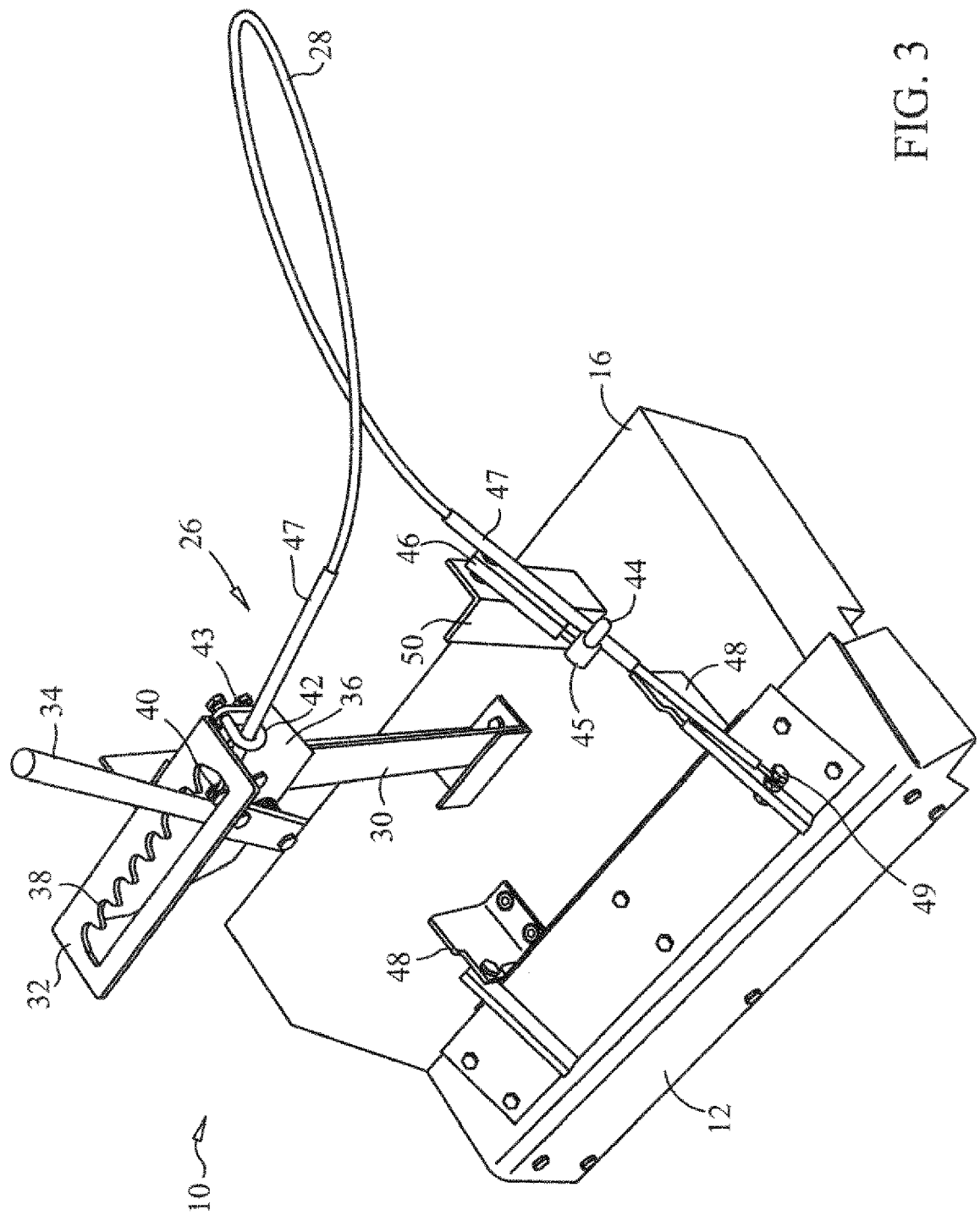
FIG. 3 is a perspective view of the mulch plate apparatus of the present invention.

The raising and lowering of mulch plate 12 is accomplished by assembly 26 shown in FIG. 3. Assembly 26 includes manually operated handle 34 connected at one end to ratchet assembly 32. Ratchet assembly 32 includes a vertical plate 36, which is connected at its lower end to support stand 30. The lower end of handle 34 is rotatably coupled to plate 36 by means commonly known in the art such as, for example, a screw and nut assembly. A coiled spring 13 (shown in FIGS. 5 and 6) provides additional forward and rearward motion when handle 34 is being used in order to secure handle 34 in one of the notches 38 and, likewise, to release handle 34 from notch 38 in order to move the handle to another location within ratchet assembly 32.

Handle 34 is movable forward and backward along the longitudinal axis of ratchet assembly 32. Ratchet assembly 32 is supported by support stand 30 and includes a plurality of interior notches 38. Handle 34 can be pushed or pulled in order to align the handle 34 in front of a notch 38 that corresponds to a desired plate height. Once a desired mulch plate height is attained, the operator can insert handle 34 within one of the interior notches 38, thus securing handle 34 therein and maintaining the height of much plate 12 at a chosen height.

Cable 28 connects apparatus 26 to mulch plate 12. Cable 28 contains an interior wire (not shown) that is coaxially situated and movable within cable 28. The wire is connected to handle 34 via securing means 40 known in the art. Cable 28 can be of different lengths in order to accommodate different types of machines. Two adjustable eyebolts 42 and 44 encircle an upper and lower portion of cable 28 and clamps 43 and 45 secure the cable thus preventing cable 28 from moving upon movement of handle 34. Preferably, cable 28 is covered by a metal barrel 47 at the point where each eyebolt 42 and 44 encircles cable 28 in order to protect the integrity of cable 28. Thus, as handle 34 is moved, cable 28 remains in place do the arrangement of eyebolts 42, 44 and clamps, 43, 45, and the wire within cable 28 moves. Because the wire is connected at one end to handle 34 and at its opposing end to the top of mulch plate 12, operation of handle 34 moves mulch plate 12 either up or down, depending upon the direction the handle 34 is moved.

Clamp 42 secures an upper portion of cable 28 to ratchet assembly 32 and clamp 44 secures a lower portion of cable 28 to a slide assembly 46, which is rotatably affixed at one end to stanchion 50. Cable 28 is connected to mulch plate at connection point 49. When handle 34 is moved forward within ratchet assembly 32, the wire within cable 28 is pushed forward with respect to cable 28, thus forcing mulch plate 12 forward and down toward a closed position. When handle 34 is pulled back, the wire within cable 28 is retracted, thus pulling mulch plate 12 upward toward an open position. Mulch plate 12 is rotatably affixed to two flanges 48 located on the top of deck 16 via clamping means known in the art, for example, two screws. Mulch plate 12 rotates about the two screws when the wire within cable 28 is either pulled or pushed upon motion of handle 34, as described above.

Figure 4:
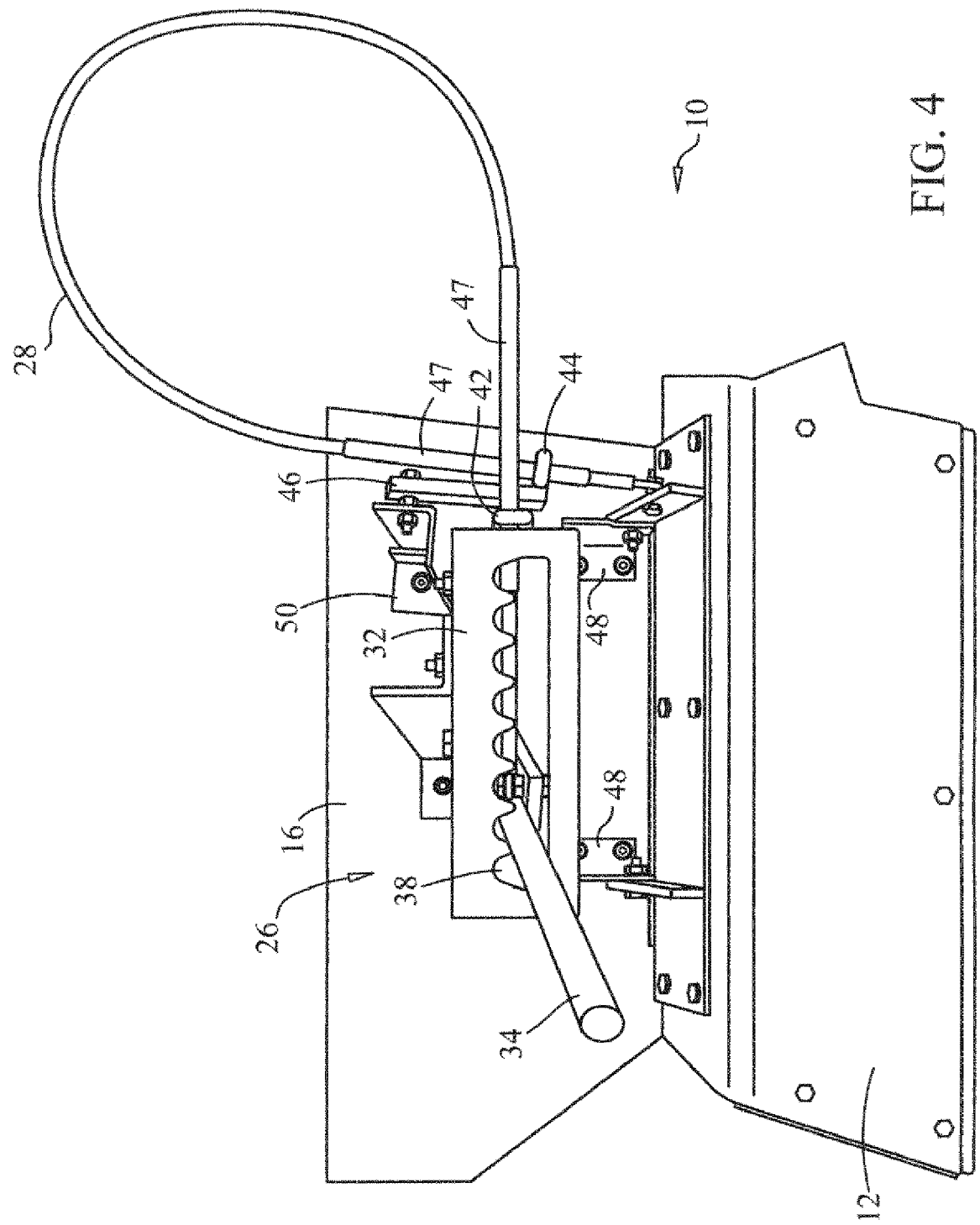
FIG. 4 is a top view of the ratchet assembly of the mulch plate apparatus.

FIG. 4 provides a top view of mulch plate adjustment assembly 26. Handle 34 is secured within a notch 38 of ratchet assembly 32, thus maintaining mulch plate 12 at a selected height. Ratchet assembly 32 is not limited to a specific number of notches 38 and may be designed to incorporate any number of notches 38. When handle 34 is moved to one end of assembly 32, mulch plate 12 is in a completely closed position thus trapping grass blades within the chute of mower 14. As handle 34 is pulled back, mulch plate 12 gradually opens in the manner described above, until handle 34 has been retracted to the opposing end of assembly 32 (shown in FIG. 4), where it is inserted within the last notch 38 in ratchet assembly 32. Although handle 34 cannot be pulled any further in the same direction due to the size constraints of assembly 32, apparatus 10 incorporates a slide assembly 46 that allows mulch plate 12 to be raised beyond this point without the use of handle 34.

Figure 5:
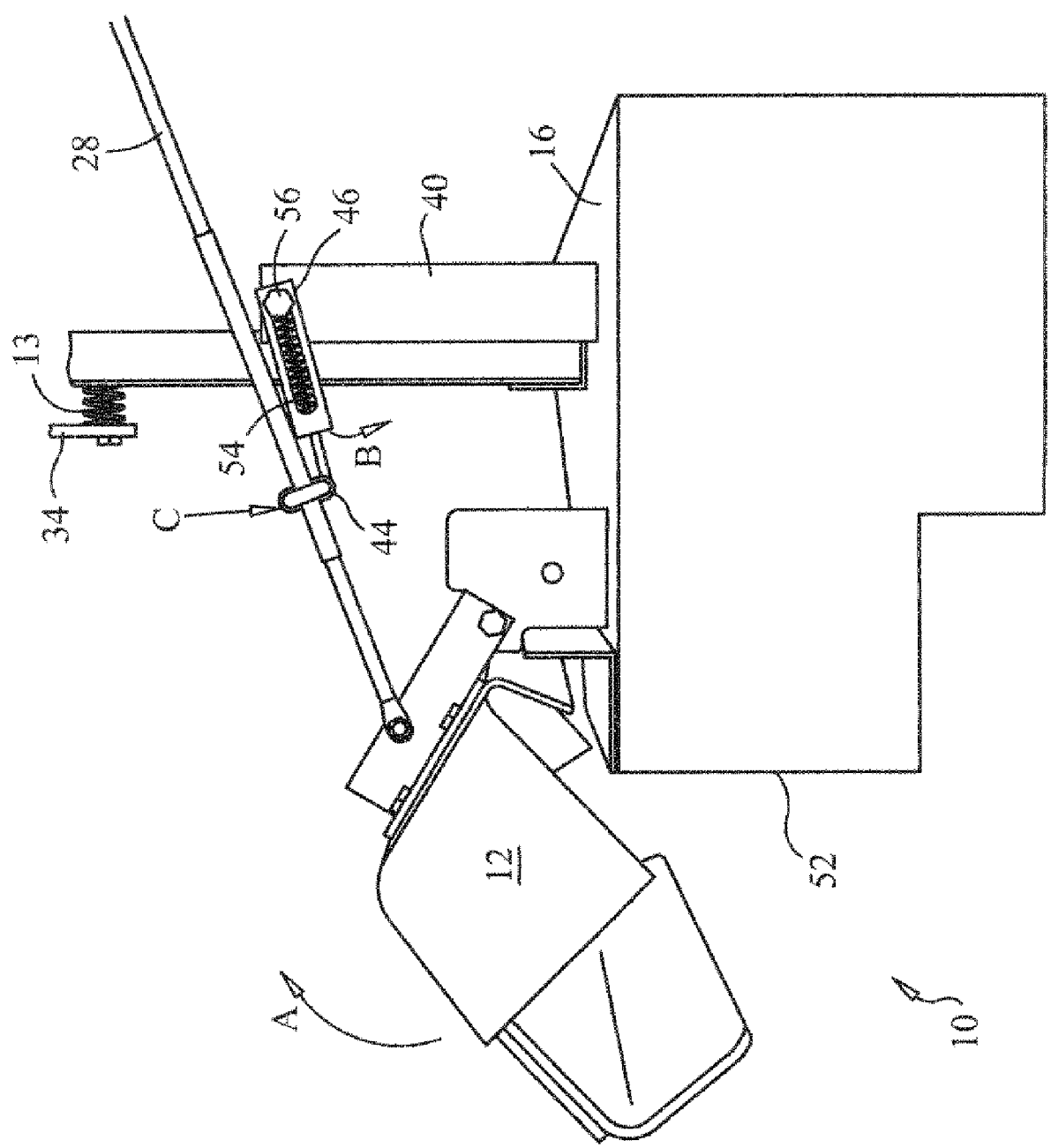
FIG. 5 is a side view of the mulch plate apparatus of the present invention illustrating the slide assembly.

As shown inn FIG. 5, slide assembly 46 is rotatably connected at one end to stanchion 50 and at its opposing end to cable 28 via eyebolt 44 and clamp 45 (not shown). Slide assembly 46 includes an elongated body having an elongated groove therein. A spring 54 is situated within the elongated groove such that when mulch plate 12 is lifted past its highest position, i.e. the highest position achieved via use of handle 34, spring 54 is compressed, thus forcing the elongated body of slide assembly 46 to move in the same relative direction as mulch plate 12 thereby allowing mulch plate 12 to be raised over deck 16 to a non-operational position.

In FIG. 5, mulch plate 12 appears in an open position corresponding to handle 34 being in a fully retracted position in assembly 32. With mulch plate 12 at this height, the operator has access to grass blade clippings within chute 52. However, apparatus 10 is not in its optimal position for storage. Preferably, apparatus 10 should be stored with mulch plate 12 in a more vertical position up and over deck 16, thus limiting the length of the apparatus 10. Rather than having to provide additional wire length to accomplish this, apparatus 10 includes slide assembly 46, which enables the operator to lift mulch plate 12 over deck 16 in the direction of arrow A.

Slide assembly 46 is preferably rectangular in shape and includes a spring 54 disposed therein. When mulch plate 12 is lifted in the direction of arrow A, slide assembly 46 pivots about connector 56 in the direction of arrow B. Connector 56 can be any connector common in the art that allows slide assembly 46 to pivot when force is applied to the opposing end of slide assembly 46. The upward movement of mulch plate 12 applies pressure down at point C moving the lower end of slide assembly 46 down slightly. As mulch plate 12 continues to rise, pressure applied at point C is received by spring 54, which compresses, moving spring assembly 46 up with respect to connector 56. The result is shown in FIG. 6.

Figure 6:
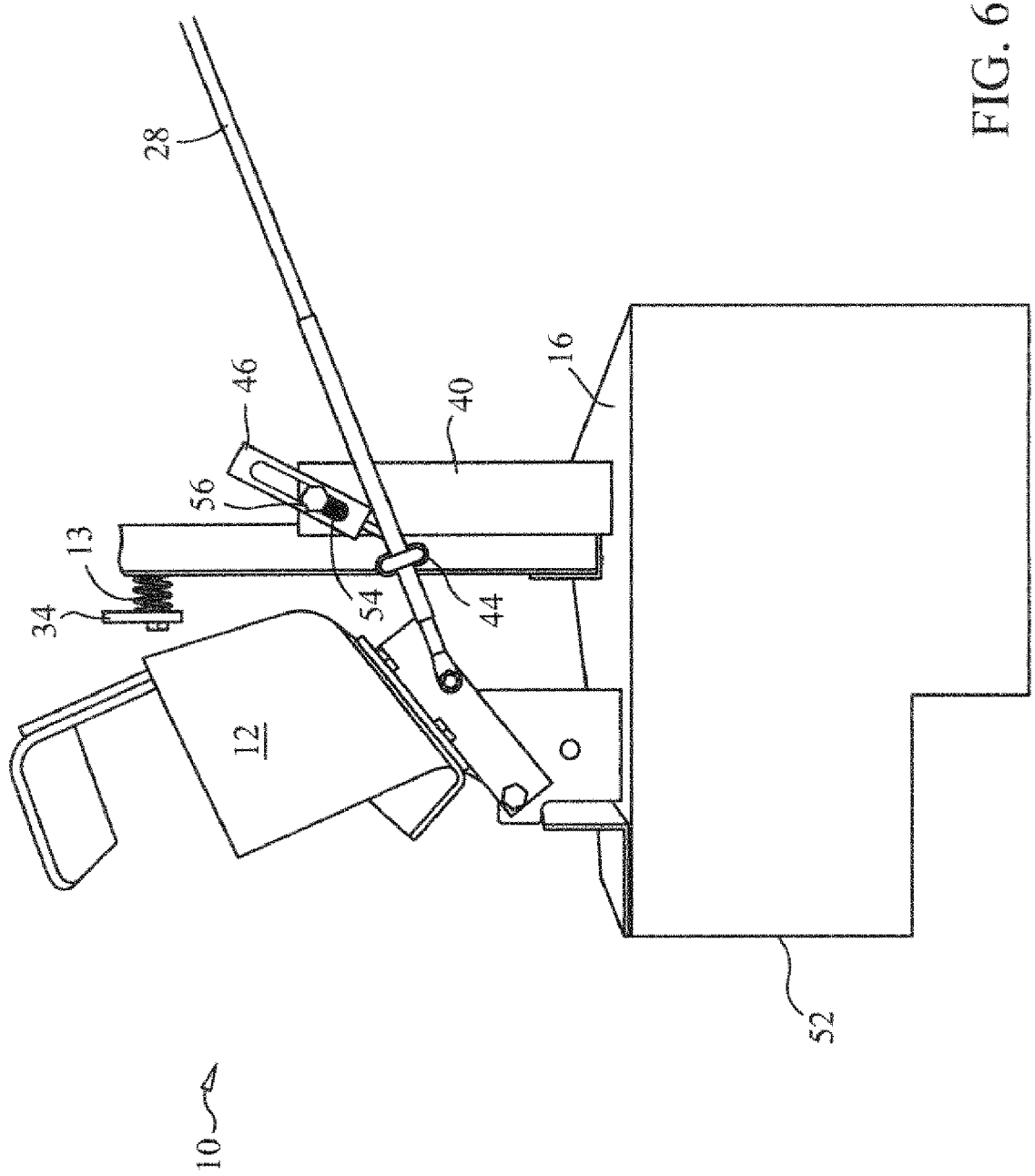
FIG. 6 is a side view of the mulch plate apparatus of the present invention illustrating the mulch plate in a storage position.

In FIG. 6, spring 54 can be seen in a compressed position. Slide assembly 46 has risen with respect to connector 56 due to the force applied to spring 54 at point C. As mulch plate 12 is lifted to its storage position, i.e. up and over deck 16, spring 54 compresses further, driving slide assembly 46 to the position shown in FIG. 6. The operator may now release mulch plate 12, where it remains in place. Thus, slide assembly 46 allows the operator to effectively increase the height that mulch plate 12 may be raised without the need to lengthen cable 28 or the wire therein. Mulch plate 12 cannot be raised to this position without manual assistance. In order to return mulch plate 12 to its operating position, the operator must first push mulch plate 12 back over deck 16, in the direction opposite arrow A. Further, spring 54 provides the necessary tension needed to control slide assembly 46 and prevent mulch plate 12 from prematurely collapsing during operation.

It should be noted that as mulch plate 12 is being raised and/or lowered due to the lateral movement of handle 34, cable 28 remains substantially fixed with respect to mulch plate 12 and assembly 26 due to eyebolts 42 and 44 while the wire that runs coaxially within cable 28 moves within cable 28 either forward or backward upon the movement of handle 34 within ratchet assembly 32.

To use mulch plate adjustment assembly 26, an operator affixes assembly 26 to deck 16, which is inserted over the front end of lawn mower 14 using conventional attachment means. During or after operation of the lawn mower 14, the operator may wish to change the position of mulch plate 12. The operator grasps handle 34 and moves handle 34 either forward or backward, while checking the height of mulch plate 12. When the desired height is attained, the operator secures handle 34 in the appropriate notch 38 in ratchet assembly 32. At this point, the operator may continue mowing the lawn, or check for debris in the chute, now accessible due to the raised plate 12. The operator may return the mulch plate to its original position, or to a new position by activation of handle 34 in the manner described above. When the operator wishes to store the lawn mower 14 and mulching apparatus 10, he or she can retract handle 34 to its farthest position in assembly 32 and secure handle 34 within the appropriate notch 38. The operator then lifts mulch plate 12 over deck 16 to its upright, storage position. This can be accomplished due to the compression of spring 54 in slide assembly 46.

FIGS. 7-11 illustrate an alternate embodiment of the present invention. In this embodiment, one or more air vents 58 in plate 12 operate to regulate the air pressure within mulching apparatus 10. Air vents 58 could be of a circular shape as shown in the figures, or may be comprised of other shapes and sizes. The air vents 58 serve to regulate air pressure and also to eliminate material from being pushed out of the back of plate 12. The air vents 58 adjust the curtain of air flowing through plate 12 and allow the air pressure to hold grass at the optimum level and in the correct area and to be pulled back under the mower deck and be re-cut.

Figure 7:
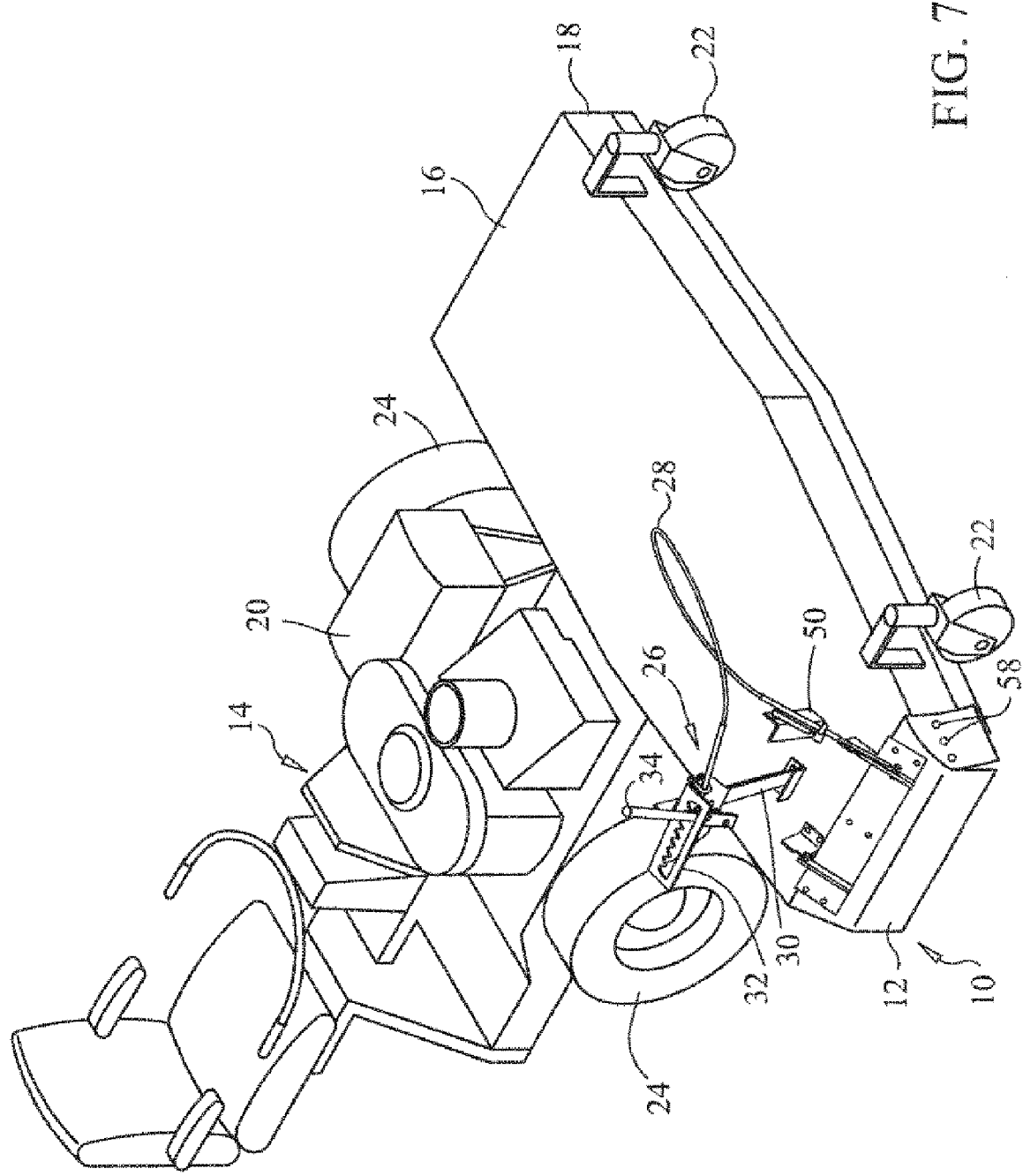
FIG. 7 is a perspective view of an alternate embodiment of the mulch plate apparatus of the present invention in a closed position affixed to a lawn mower.
Figure 8:
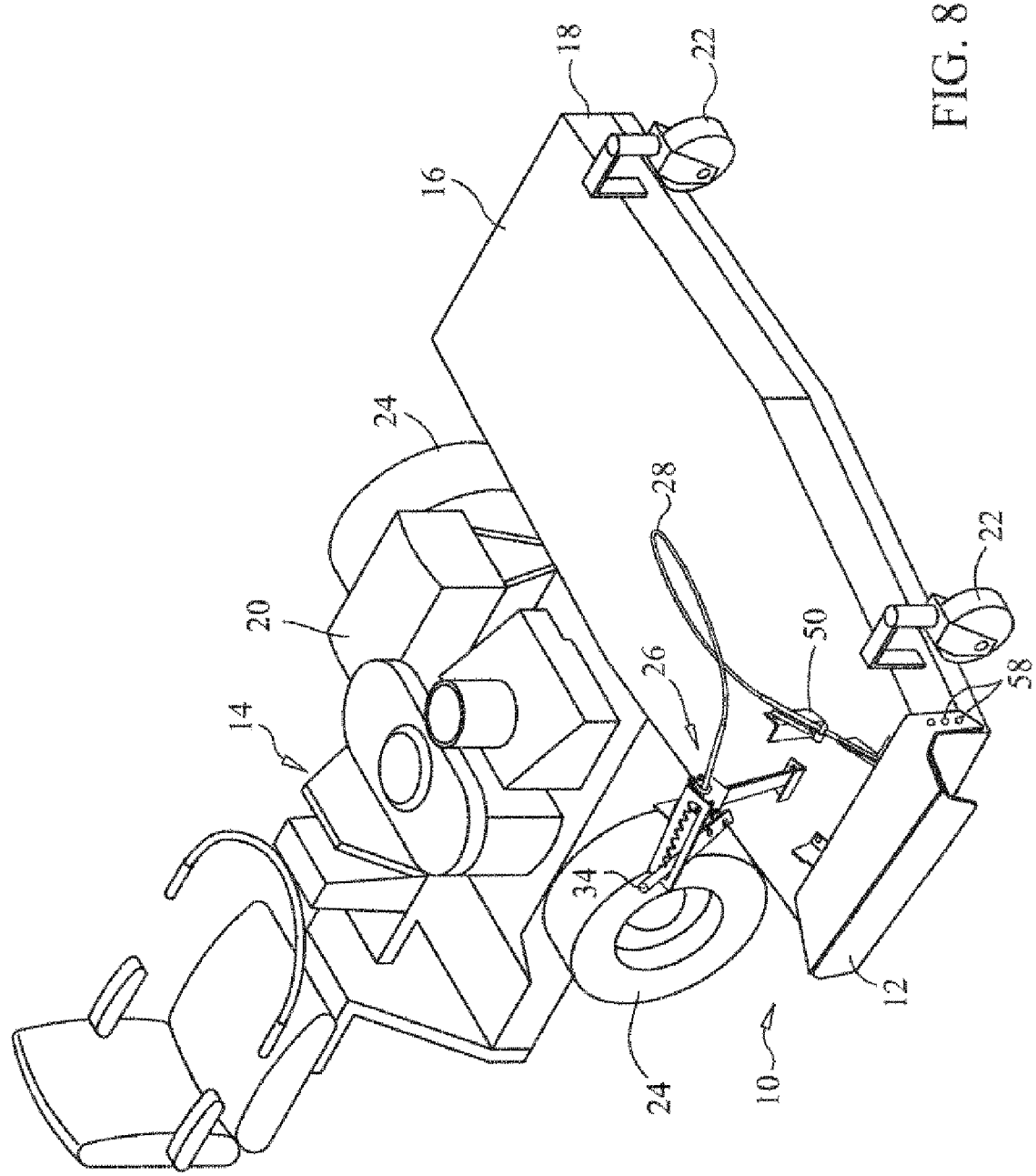
FIG. 8 illustrates a perspective view of the alternate embodiment of the mulch plate apparatus of the present invention in an open position.
Figure 9:
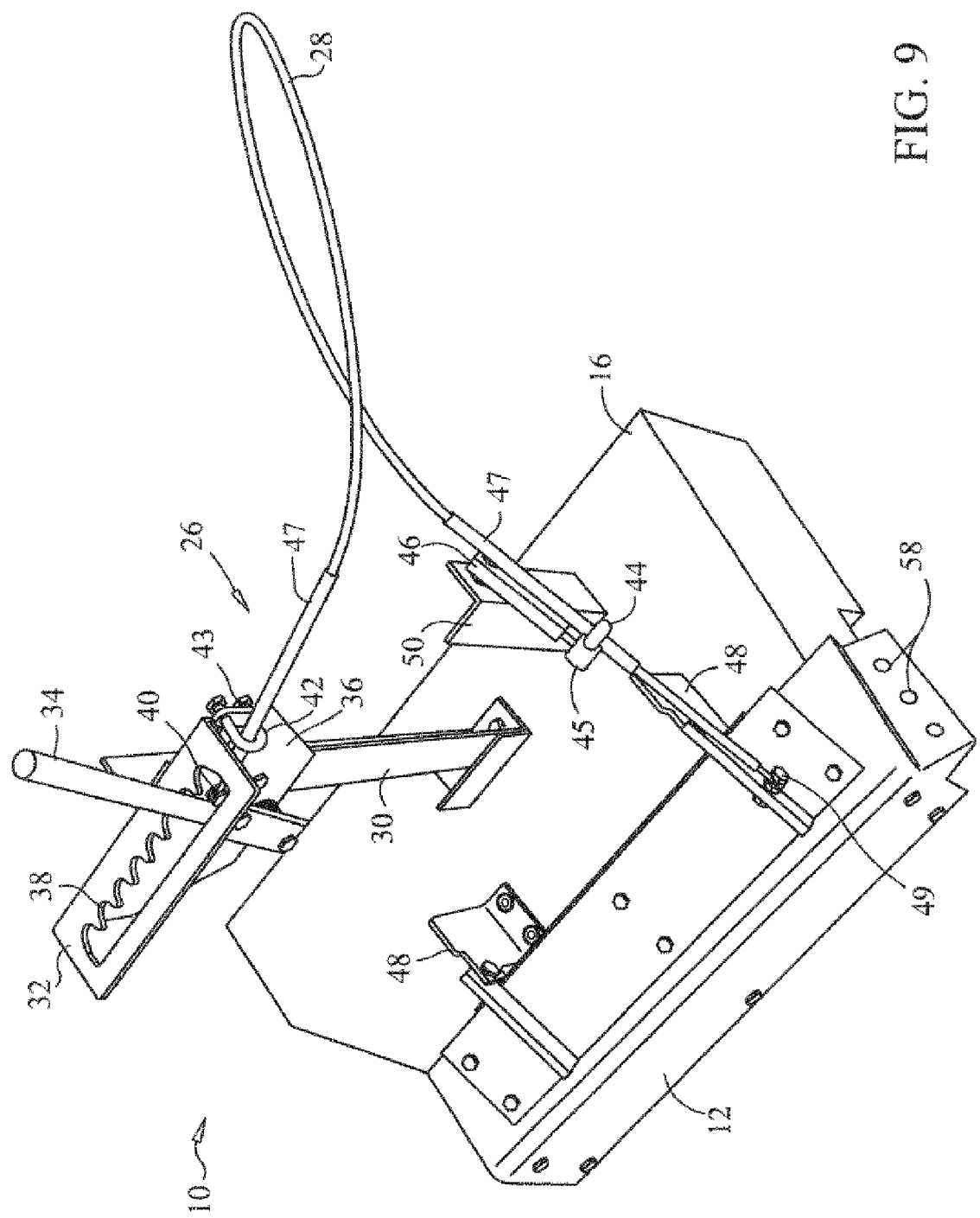
FIG. 9 is a perspective view of the alternate embodiment mulch plate apparatus of the present invention.
Figure 10:
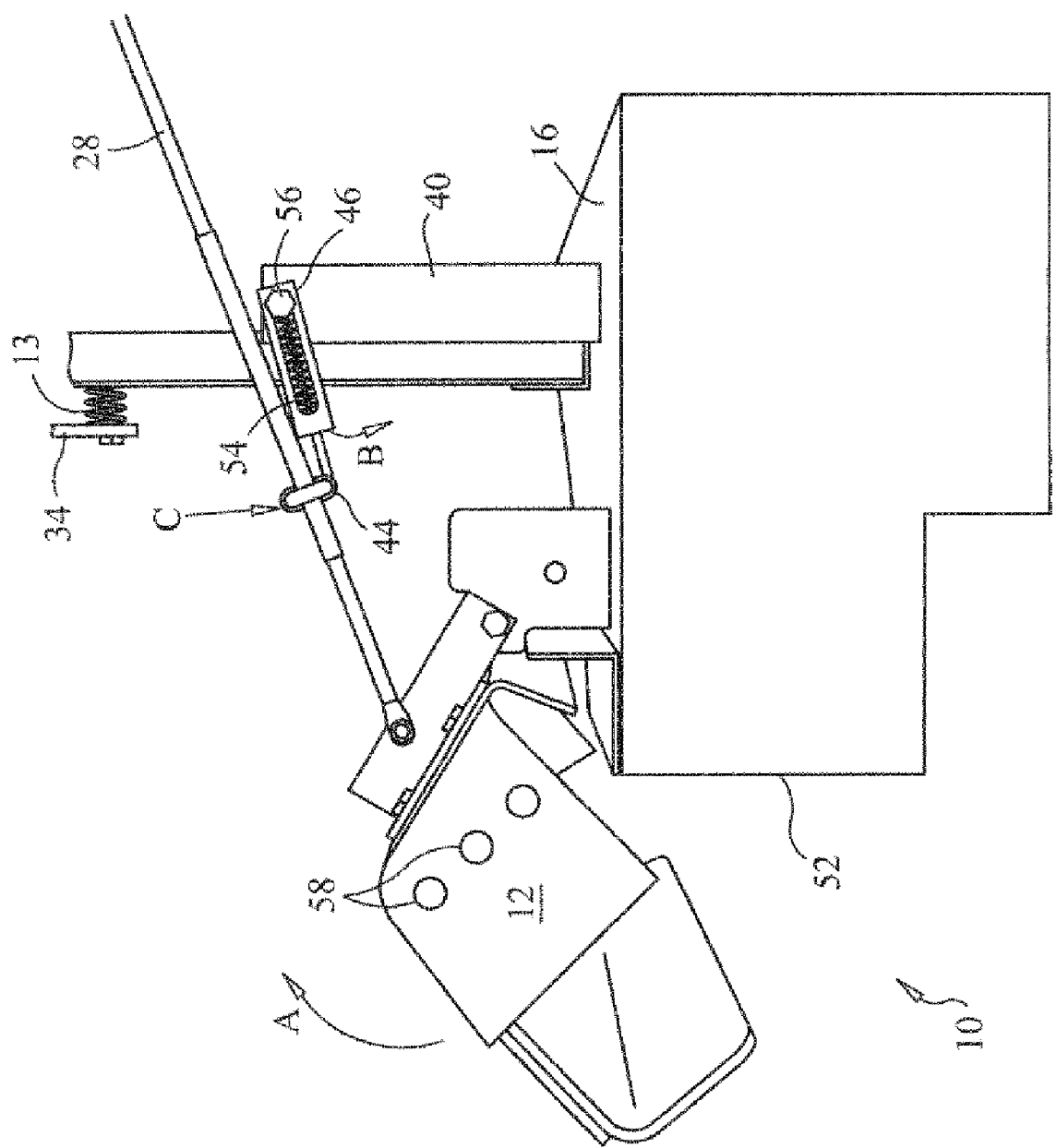
FIG. 10 is a side view of the alternate embodiment of the mulch plate apparatus of the present invention illustrating the slide assembly.
Figure 11:
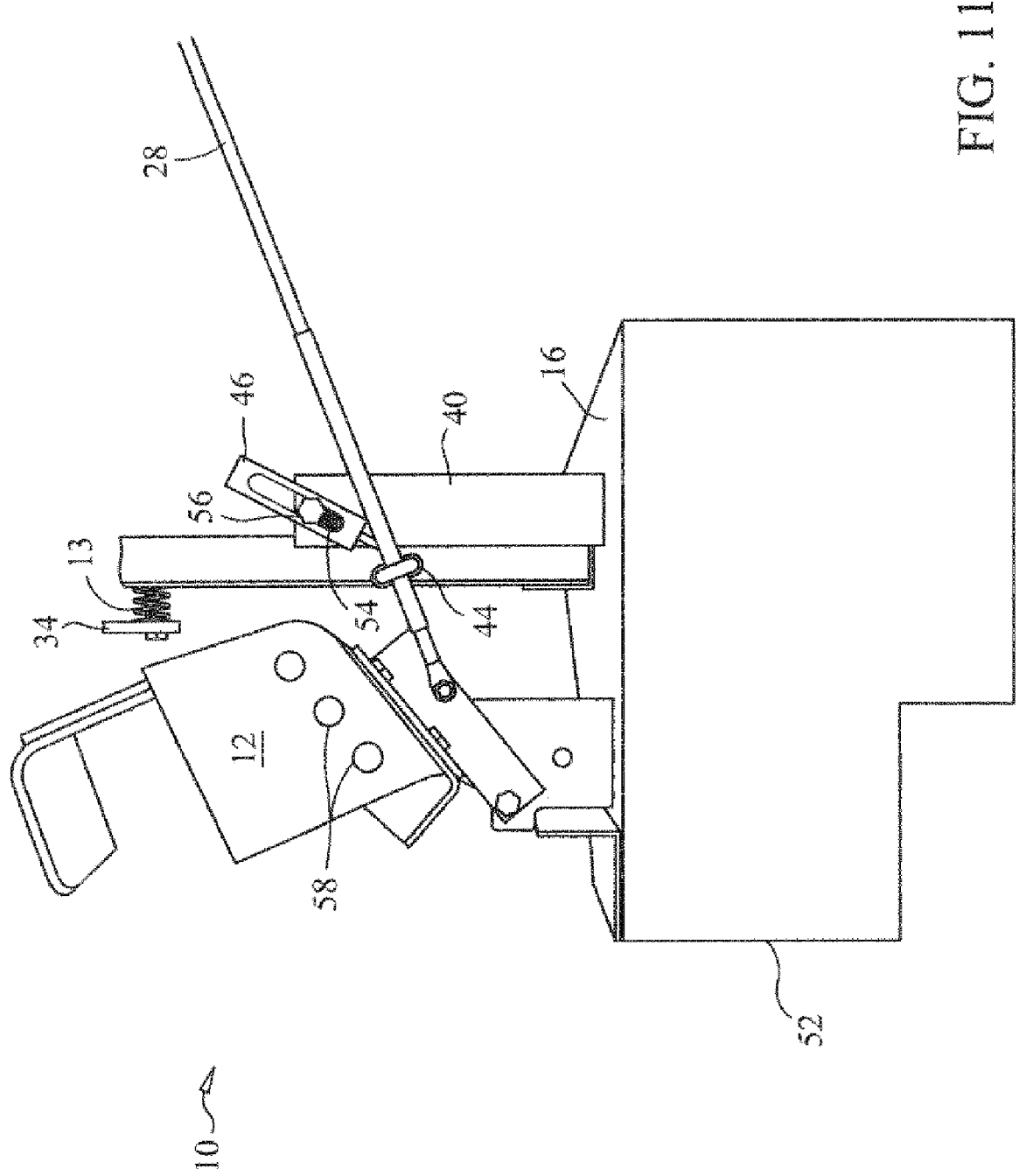
FIG. 11 is a side view of the alternate embodiment of the mulch plate apparatus of the present invention illustrating the mulch plate in a storage position.

FIGS. 7 and 9 show three vents 58 on one side of plate 12 while plate 12 is in a closed configuration. FIGS. 8, 10 and 11 show three vents 58 on one side of plate 12 while plate 12 is in an open configuration. The invention is not limited to only three vents 58 and may include any number of air vents. Nor is the invention limited to air vents 58 on one particular side of plate 12. Air vents may be placed at various locations on mulch plate 12 until an optimal air pressure is obtained.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A mulch plate apparatus for use with a lawn mower, the lawn mower having a discharge chute for expulsion of mower clippings, the mulch plate apparatus comprising:
    a deck oriented over the discharge chute of the lawn mower;
    a mulch plate rotatably connected to the deck so as to be struck by mower clippings expelled through the discharge chute, the mulch plate including one or more air vents;
    a mulch plate adjustment assembly connected to the mulch plate and affixed to the deck to facilitate raising and lowering of the mulch plate, the mulch plate adjustment assembly comprising:
        an elongated support stand;
        a handle retention assembly connected to the support stand, the handle retention assembly comprising a ratchet assembly having a frame with one or more interior handle-retention notches for selectably retaining the handle in one of a variety of different positions;
        a handle movable within the handle retention assembly; and
        a mulch plate connection assembly connecting the handle retention assembly to the mulch plate in order to facilitate raising and lowering the mulch plate by operation of the handle, the mulch plate movable from a lowest position to a highest position and increments therebetween;
    an elongated stanchion extending up from the deck; and
    a slide assembly rotatably affixed at one end to the stanchion by retaining means and at its opposing end to a cable, wherein the slide assembly allows the mulch plate to be manually lifted beyond the highest position to a non-operational position.

2. The mulch plate apparatus of claim 1, wherein the slide assembly comprises:
    an elongated body having an elongated groove therein; and
    a spring within the elongated groove such that when the mulch plate is lifted past the highest position, the spring is compressed forcing the elongated body to move with respect to the retaining means in the same direction as the mulch plate thereby allowing the mulch plate to be raised over the deck to a non-operational position.

3. A mulch plate adjustment assembly for use with a mulch plate rotatably attached to a lawn mower, the mulch plate adjustment assembly comprising:
    a handle retention assembly affixed to the lawn mower, the handle retention assembly including a handle-retention groove, the groove of the handle retention assembly having one or more interior notches for selectably retaining the handle in one of a variety of different positions;
    a handle movable within the groove of the handle retention assembly; and
    a mulch plate connection assembly connecting the handle retention assembly to the mulch plate in order to facilitate raising and lowering the mulch plate by operation of the handle, the mulch plate including one or more air vents, the mulch plate further movable from a lowest position to a highest position and increments therebetween, the mulch plate connection assembly comprising:
        a cable coupling the ratchet assembly to the mulch plate, the cable held in place by one or more securing bolts; and
        a wire coaxially and movably situated within the cable such that moving of the handle in a first direction retracts the wire within the cable thus raising the mulch plate and moving the handle in an opposite direction extends the wire within the cable thus lowering the mulch plate;
    an elongated stanchion affixed to the lawn mower; and
    a slide assembly rotatably affixed at one end to the stanchion by retaining means and at its opposing end to the cable, wherein the slide assembly allows the mulch plate to be manually lifted beyond the highest position to a non-operational position.

4. The mulch plate adjustment assembly of claim 3, wherein the slide assembly comprises:

an elongated body having an elongated groove therein; and a spring within the elongated groove such that when the mulch plate is lifted past the highest position, the spring is compressed forcing the elongated body to move with respect to the retaining means in the same direction as the mulch plate thereby allowing the mulch plate to be raised in a non-operational position.

5. A mulch plate apparatus for use with a lawn mower, the lawn mower having a discharge chute for expulsion of mower clippings, the mulch plate apparatus comprising:

a mulch plate rotatably connected to the lawn motor so as to be struck by mower clippings expelled through the discharge chute, the mulch plate including one or more air vents;

a mulch plate adjustment assembly affixed to the lawn mower to facilitate raising and lowering of the mulch plate, the mulch plate adjustment assembly comprising:

an elongated support stand;

a handle retention assembly connected to the support stand, the handle retention assembly comprising a ratchet assembly having a frame with one or more interior handle-retention notches for selectably retaining the handle in one of a variety of different positions;

a handle movable within the handle retention assembly; and a mulch plate connection assembly connecting the handle retention assembly to the mulch plate in order to facilitate raising and lowering the mulch plate by operation of the handle, the mulch plate movable from a lowest position to a highest position and increments therebetween;

an elongated stanchion extending up from the lawn mower; and a slide assembly rotatably affixed at one end to the stanchion by retaining means and at its opposing end to a cable, wherein the slide assembly allows the mulch plate to be manually lifted beyond the highest position to a non-operational position.

6. The mulch plate apparatus of claim 5, wherein the slide assembly comprises:

an elongated body having an elongated groove therein; and a spring within the elongated groove such that when the mulch plate is lifted past the highest position, the spring is compressed forcing the elongated body to move with respect to the retaining means in the same direction as the mulch plate thereby allowing the mulch plate to be raised over the deck to a non-operational position.

* * * * *